(12) United States Patent
Duke et al.

(10) Patent No.: US 9,127,863 B2
(45) Date of Patent: Sep. 8, 2015

(54) MOUNTING FOR SOLAR PANELS

(76) Inventors: Mike David Duke, Hamilton (NZ); Loey Abdle Salam, London (GB)

( * ) Notice: Subject to any disclaimer, the term of this patent is extended or adjusted under 35 U.S.C. 154(b) by 1177 days.

(21) Appl. No.: 12/802,094

(22) Filed: May 27, 2010

(65) Prior Publication Data
US 2011/0083381 A1    Apr. 14, 2011

Related U.S. Application Data

(63) Continuation of application No. 12/350,339, filed on Jan. 8, 2009, now abandoned, which is a continuation of application No. 10/542,995, filed as application No. PCT/GB2004/000222 on Jan. 20, 2004, now abandoned.

(30) Foreign Application Priority Data

Jan. 21, 2003    (GB) .................................. 0301280.4

(51) Int. Cl.
| | | |
|---|---|---|
| *H01L 31/042* | (2014.01) | |
| *F24J 2/52* | (2006.01) | |
| *H02S 20/23* | (2014.01) | |
| *H02S 20/24* | (2014.01) | |
| *F24J 2/46* | (2006.01) | |

(52) U.S. Cl.
CPC .............. *F24J 2/5239* (2013.01); *F24J 2/4638* (2013.01); *F24J 2/523* (2013.01); *F24J 2/5237* (2013.01); *H02S 20/23* (2013.01); *H02S 20/24* (2013.01); *F24J 2002/467* (2013.01); *F24J 2002/4692* (2013.01); *Y02B 10/12* (2013.01); *Y02B 10/22* (2013.01); *Y02E 10/47* (2013.01)

(58) Field of Classification Search
CPC ..... E04D 13/18; E04D 13/00; F24J 2002/467; F24J 2/523; F24J 2/5239; F24J 2/5237; F24J 2/4638; F24J 2002/4698; H01L 31/0422; H01L 31/0484; H02S 20/23; H02S 20/24; Y02B 10/12; Y02E 10/47
USPC ......................................... 136/244; 52/173.3
See application file for complete search history.

(56) References Cited

U.S. PATENT DOCUMENTS

| | | | | |
|---|---|---|---|---|
| 5,316,592 | A | * | 5/1994 | Dinwoodie .................... 136/244 |
| 5,746,839 | A | * | 5/1998 | Dinwoodie .................... 136/251 |
| 2002/0043277 | A1 | * | 4/2002 | Yamawaki .................... 136/244 |
| 2002/0066828 | A1 | * | 6/2002 | Nakamura et al. ............ 244/173 |

FOREIGN PATENT DOCUMENTS

| | | | | | |
|---|---|---|---|---|---|
| JP | 06-264571 | A | * | 9/1994 | ............... E04D 3/40 |
| JP | 2001-111082 | | * | 4/2001 | ............ H01L 31/042 |

OTHER PUBLICATIONS

JP2001-111082, Machine Translation, Fujiwara, Apr. 2001.*
JP06-264571A, Machine Translation, Sato, Sep. 1994.*

* cited by examiner

*Primary Examiner* — Devina Pillay
(74) *Attorney, Agent, or Firm* — Blank Rome LLP

(57) ABSTRACT

A mounting for solar panels has fixings which enable it to be easily attached to other mountings for a solar array and can be made of recycled plastic by vacuum forming.

9 Claims, 4 Drawing Sheets

MOUNTING FOR SOLAR PANELS

CROSS-REFERENCE TO RELATED APPLICATIONS

This application is a continuation of U.S. patent application Ser. No. 12/350,339, filed on Jan. 8, 2009, which is a continuation of U.S. patent application Ser. No. 10/542,995, filed on Mar. 31, 2006, which is a national stage application, filed under 35 U.S.C. §371, of International Application No. PCT/GB2004/000222, filed on Jan. 20, 2004, which claims priority to United Kingdom Application No. 0301280.4, filed on Jan. 21, 2003. The entire disclosures of these applications are incorporated herein by reference in their entireties.

The present invention relates to a mounting for solar panels which can be used on roofs etc.

Building Integrated Photovoltaics (BIPV) is a rapidly growing industry worldwide (about 25% growth annually). BIPV involves solar modules mounted on buildings and the DC electricity generated fed to the national grid through DC/AC inverters.

Many existing systems require structural changes to the roof or penetration of the roof which can lead to leaks and can be difficult to install involving building work.

It is known to mount photovoltaic (PV) modules in mountings for attachment to roofs. U.S. Pat. No. 6,570,084 discloses PV assemblies which can be fixed to roofs. The PV assemblies may be interengaged, such as by interengaging the bases of adjacent PV assemblies. The base may include a main portion and a cover and the bases of adjacent PV assemblies may be interengaged by securing the covers of adjacent bases together. The PV module may be an inclined PV module and the support assembly may be a multi-position support assembly which secures the PV module at shipping and inclined-use angles. However such a structure is difficult to assemble in use on a roof and, although systems are disclosed to reduce the effect of wind on the modules, when they are assembled they are subjected to unacceptable forces and rain, etc. can penetrate between the modules. The interengaging of the modules is accomplished by securing the covers of adjacent bases together thus requiring the fitting of each module to the roof individually so that each module has to be resistant to forces such as wind forces acting on the module.

We have now devised a modular mounting for solar panels which can be interengaged with other mountings which overcomes these difficulties and which by assembling modules together can form an integrated solar array of any size.

According to the invention there is provided a mounting for solar panels which mounting comprises a frame having a recess for receiving solar panels, the frame having a front edge and a rear edge in which the front edge is narrower than the rear edge and the front edge of one frame is adapted to fit beneath and inside the rear edge of another frame and to be attached to the said other frame, the frame having side fixing means so that a plurality of frames can be attached to each other in a side-by-side arrangement and the frame sloping upwards from the front to the back.

Front, back, side and top refer to the frame when the frame is laid on a flat surface with the recess uppermost.

In use a solar panel or solar panels are placed in the recess in the frame so that sunlight can impinge on the solar panels. To cover a larger area a plurality of frames are connected together with the front edge of one frame fitting within and connected to the rear edge of another frame and/or frames being connected side by side. In this way any size of area can be covered with solar panels.

Preferably the frame is made by vacuum forming of a plastics material e.g. a recycled plastic.

The angle of slope of the mounting is preferably 5 to 20 degrees e.g. about 10 degrees and can be achieved by having a wedge shaped side piece attached to each side or under the mounting so the mounting has a wedge shape.

The recess in the top of the mounting preferably is of a size to allow a standard solar panel module to fit into the recess and in one embodiment the top of the solar module is flush with the top surface of the mounting.

In another embodiment there is a gap between the top of the solar panel module and the top of the recess and in order to allow for pressure equalisation e.g. reduced pressure on the upper surface caused by wind passing over the surface, there can be recesses, slots or holes on the upper face of the recess above the solar panel module connecting through the module. These recesses, slots or holes help with ventilation which can reduce the PV cells temperature and hence increase the cells efficiency.

Preferably there is space in the recess to accommodate the solar panel junction box on the underneath of the solar module containing solar panels, with holes for wiring from the junction box to inside the mounting.

The solar panel module can be fixed to the mounting with either rivets or self-tapping screws through the underside of the mounting.

The back of the mounting preferably has an opening and a lip so that the front thinner end of another mounting can be inserted into the opening and fixed in place e.g. by riveting or screwing in place.

This can be done with a number of mountings so that a row of interlocked mountings can be assembled. The design and size of the ends preferably minimises the shading effect of the back end on the solar panel in the next mounting module in the line.

The side fixing means of each frame enables the mountings to be attached to each other. These fixing means can be of a conventional type e.g. with the attachment means on one side being smaller than one the other side allowing them to be interlocked with the fixing means on adjacent mountings. Preferably the fixing means are hollow so that the cables etc. from the solar modules can be fed into each mounting without being seen and out of touch.

The mountings can be attached to each other by any fixing means e.g. by riveting or screwing to each other.

By attaching mountings to each other in columns and rows a completely interlocked solar array can be assembled of any size and there could be many hundreds of interlocked mountings making a complete installation.

In order to allow more secure fixing the front end of the wedge shaped mounting preferably has a flange to allow a covering to be overlapped with the flange so that the front of the flange is firmly held to a surface. This gives final security in case of high winds and 'traps' the interlocked array.

In an array preferably the outer mountings of the assembled interlocked array have additional 'caps' riveted or screwed through the sides and back thick wedge end to cover the holes and provide a flange for the floor covering to overlap ensuring the array is 'trapped' on all sides, thus minimising possible lift of the array due to high winds. There are preferably drainage channels on the base flange of the mounting to allow water to flow from under the mounting.

In use the wires from each solar module in a mounting can be connected to other solar modules to enable the electricity generated to be led a way. The connections can be in parallel and/or series to produce the optimum current and voltage.

When the modules are in position the PV arrays can be inserted into the modules and fixed in the normal way; alternatively the PV arrays can be inserted into the modules before the modules are positioned on the roof or other support structure. This also enables the PV arrays to be transported together with the support structures in compact and stackable configuration saving transport cost and site assembly time.

It is a feature of the mounting of the present invention that flush modules in the mounting give an integrated appearance; it is easy to install so eliminating time spent on building work, it is low cost and is fast to install without highly skilled labour, reducing labour cost and is easy to disassemble and stack so repairs and roof maintenance can be carried out. When assembled the interlocking of the mounting ensures the complete solar array is one assembled 'block' and edge covering and interlocking ensures safety in high winds.

For increased security e.g. against wind etc. at least some of the end modules can have extra fittings attaching them to the roof or support surface or adjacent structure; these extra fittings can be attached to a strong or integrated structure, such as a joist or wall etc. so that the assembled structure is held as one unit by this extra fitting.

The mounting can easily be made from recycled plastics materials e.g. by vacuum forming.

As well as being mounted on roofs an array can easily be mounted anywhere and is specifically designed for use with flat roofs; the modular arrangement enables shapes other than rectangular to be more nearly filled with solar panels.

For the northern hemisphere the mounting will be orientated towards the south to maximize energy collection.

The light weight integrated nature of a structure is formed from a number of modules, thus making retrofit easier and reducing the cost for both retrofit and new construction. The integrated nature of such a structure can reduce or eliminate the need for the use of roof membranes (or other support surface) penetrating fasteners; this helps to maintain the integrity of the membrane.

When designed properly, the assembly can serve as a protective layer over the roof membrane or support surface, shielding from temperature extremes and ultraviolet radiation.

As well as providing power an assembled structure of a number of modules can act as an insulator for a building increasing the thermal efficiency of the building.

In order to transport a number of the modules they can be stacked with alternate orientations to provide a compact regular stack of modules.

The invention is illustrated in the drawings in which:—

Figure 1B:
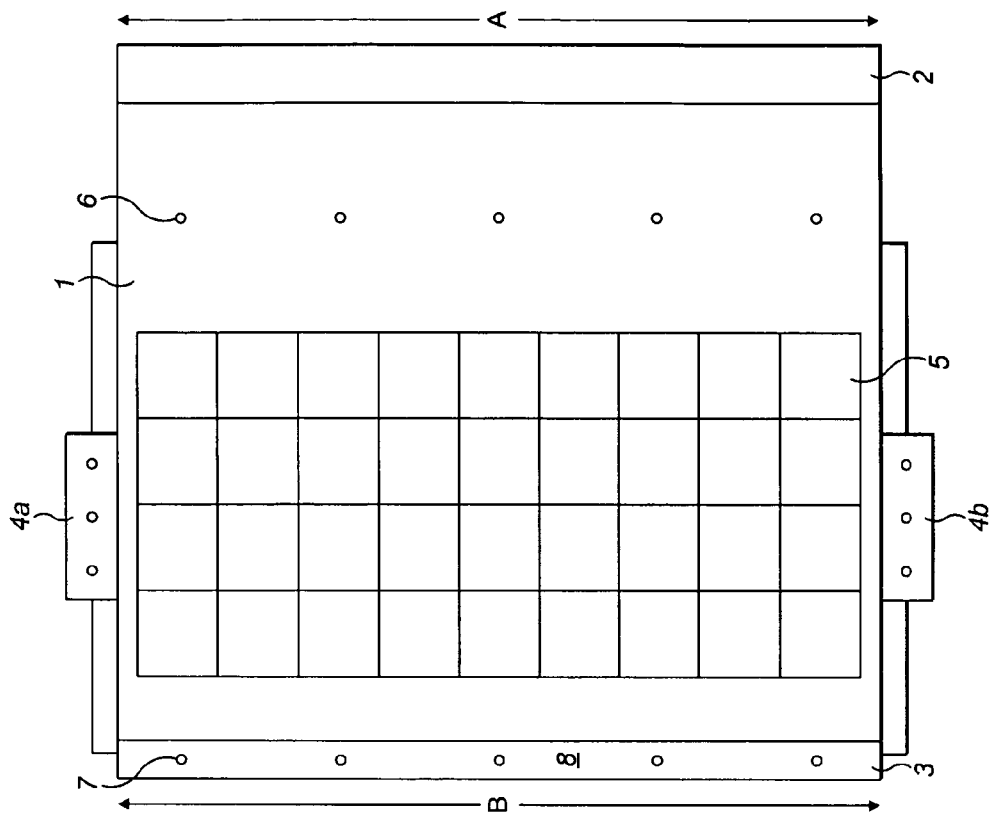
FIG. 1b shows a plan view of a module
Figure 1A:
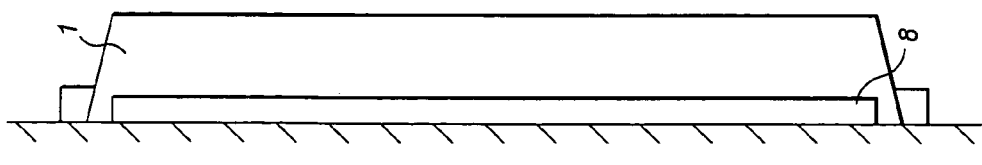
FIG. 1a shows a rear view of a mounting
Figure 2:
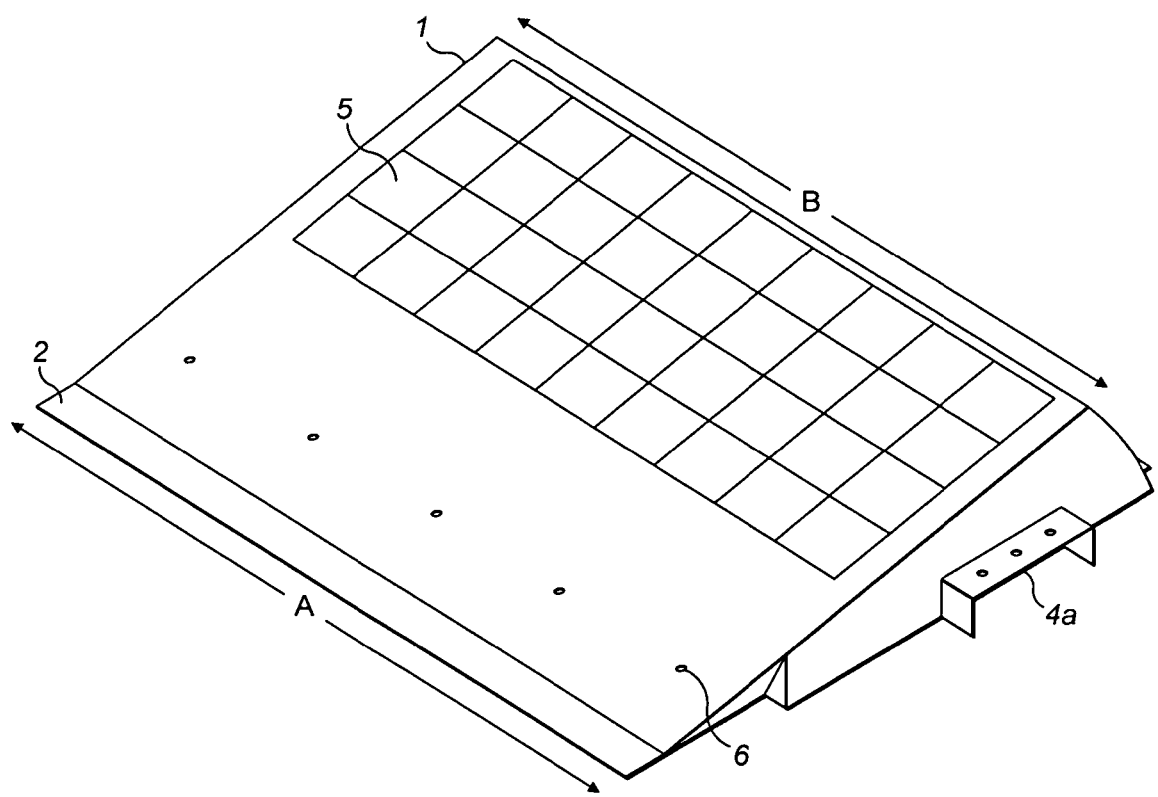
FIG. 2 shows a schematic view of the module of FIG. 1

Referring to FIGS. 1 and 2 of the drawings, a mounting has a frame (1) with a recess into which a solar panel array (5) fits. The mounting has a front edge flange (2) and a rear opening in edge (8). The distance A is less than the distance B and there are fixing holes for rivets or screws at (6) and (7) and side interlocking fixings (4a) and (4b). As can be seen in FIG. 1a, the rear edge (8) is in the form of an opening so that the front flange (2) of another mounting can fit into the opening and the mountings held together by rivets or screws passing through (6) and (7).

Figure 3A:
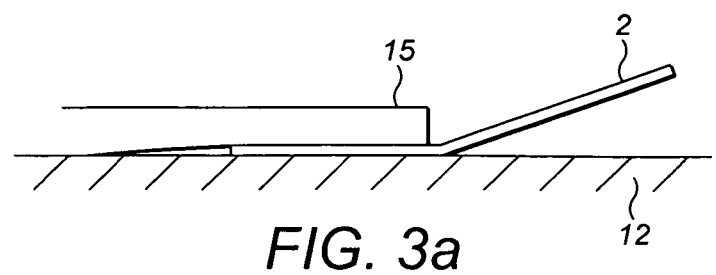
FIG. 3a shows the front fixing to a surface

Referring to FIG. 3a the front flange (2) is positioned under a mat (15) which is attached to a roof surface (12) to hold the front flange (2) firmly in place and to prevent entry of water and to prevent wind lifting the edge.

Figure 3B:
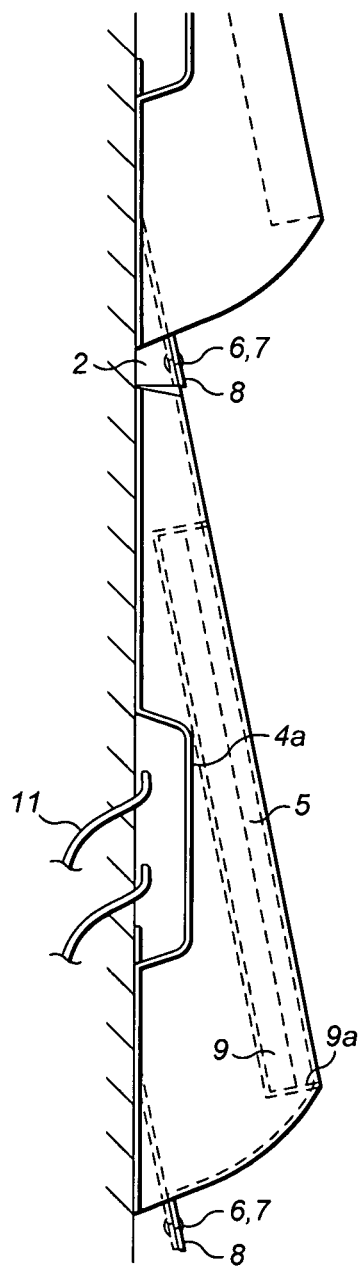
FIG. 3b shows a side view

Referring to FIG. 3b there is a PV or solar module (5) which fits into the recess (9). The cables (11) pass out through side fixing (4a). There are pressure equalisation holes (9a) so that pressure above and below the assembled frame are equalised. These holes also increase the ventilation and help reduce the PV cell temperature and increase their efficiency.

Figure 4:
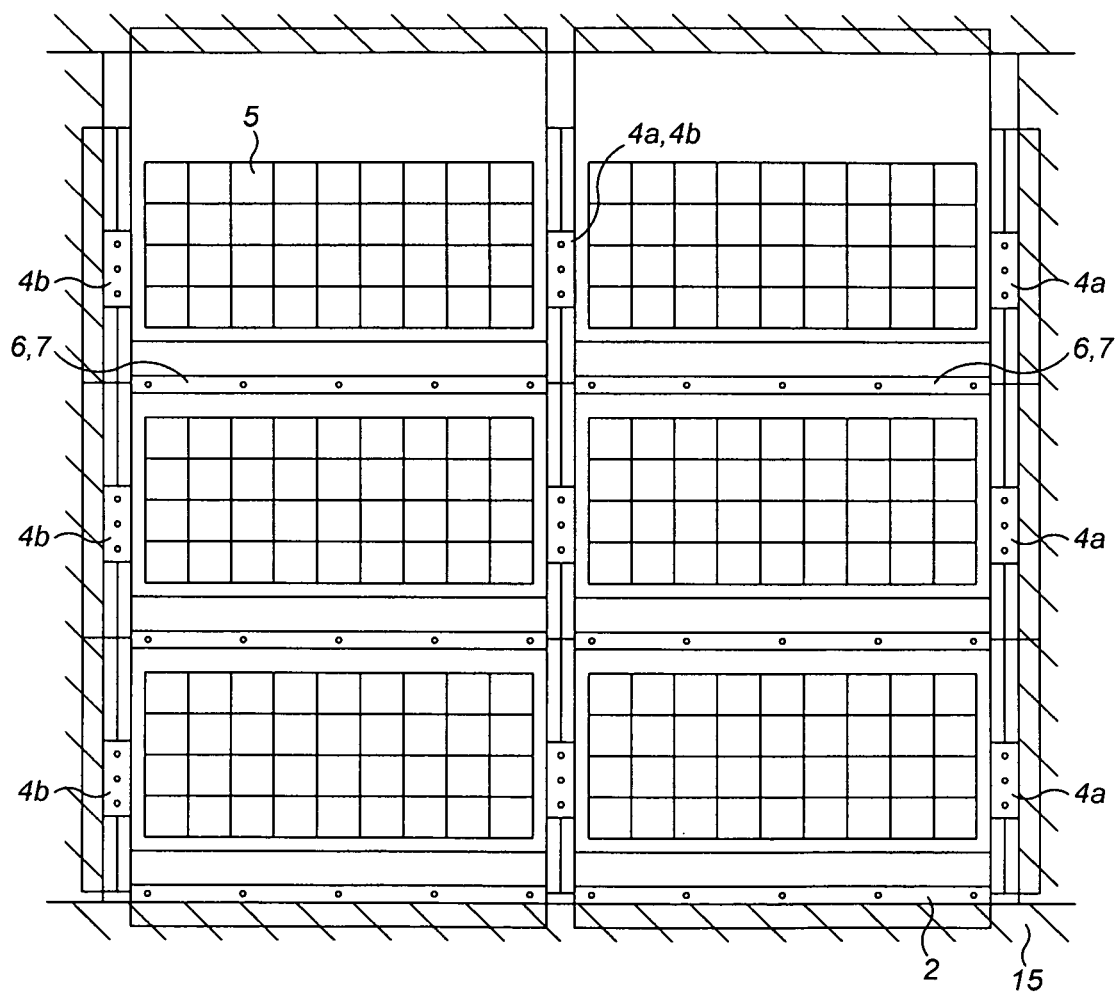
FIG. 4 shows a plan view of an assembled array

To assemble the array shown in FIG. 4 a number of modules are interlocked with the front edge flange (2) of one mounting fitting into the rear opening of another mounting as shown in detail in FIG. 3b. The side fixings (4a) and (4b) are interconnected to lock the mountings together to form a continuous interlocked module. The cables of the solar panels are connected together in the appropriate way and the whole array assembled for use. A structure is formed on a roof which can cover the roof.

The invention claimed is:

1. A solar assembly adapted to be located on a roof or like supporting structure, the assembly comprising a plurality of interconnected frames each including a front edge, a rear edge, wedge shaped side pieces which extend between said front and rear edges, and an upper surface which extends between the front and rear edges and the side pieces and slopes upwardly from the front edge to the rear edge;

a recess having an edge surface formed in the upper surface of each frame and a solar panel array supported by said edge surface of said recess of each frame to close the said each frame;

said front edge of each frame being narrower than said rear edge of each frame and said rear edge including an opening into which the front edge of an adjoining frame is inserted;

said opening, in use, being closed on its lowermost side by the supporting structure on which the assembly is located;

first fixing means for locking said front edge within said opening with an underside of the front edge in contact with the supporting structure; and second fixing means for connecting the wedge shaped side pieces of each frame to the wedge shaped side pieces of adjoining frames.

2. An assembly according to claim 1, wherein the angle of the slope of each frame is between 5 and 20 degrees.

3. An assembly according to claim 1, wherein the upper surface of each frame includes an aperture to enable equalization of air pressure above and below the solar panel.

4. An assembly according to claim 1, wherein the recess in the top surface of the frame is configured to enable a standard solar panel to be fitted into the recess so that the upper surface of the solar panel when fitted in the recess is flush with the upper surface of the frame.

5. An assembly according to claim 1, wherein the opening is partly defined by a lip in a rear face of each frame so that the front thinner end of another frame can be inserted into the opening and fixed into place.

6. An assembly according to claim 1, wherein the frame is made by vacuum forming of a plastics material.

7. A solar array comprising a plurality of solar frames according to claim 1, wherein the respective frames are connected together.

8. A mounting for solar panels, the mounting comprising a frame having a front edge, a rear edge, an upper surface formed with a recess for receiving at least one solar panel, and side fixings that enable a plurality of like frames to be coupled together in a side-by-side arrangement, the frame sloping upwards from the front edge to the rear edge so that a solar panel received in said recess is inclined with respect to a supporting structure on which said frame is supported in use;
  wherein said front edge of said frame includes a recessed outwardly projecting lip portion that cooperates with said upper surface to define an opening when said mounting is installed on said structure; whereby said front edge of one said frame is capable of being inserted into and through a said opening in another like frame until a top surface of said one frame abuts against said lip portion of said other like frame so that said front edge of said one frame fits beneath and inside the rear edge of said other like frame, said lip portion being configured to enable said one frame to be attached to said other like frame.

9. A solar assembly adapted to be located on a roof or like supporting surface, the assembly comprising a plurality of interconnected frames each including a front edge, a rear edge, wedge shaped side pieces which extend between said front and rear edges, and an upper surface which extends between the front and rear edges and the side pieces and slopes upwardly from the front edge to the rear edge;
  a plurality of solar panels supported by said assembly;
  first fixing means located on the front edge of each frame;
  second fixing means located on the rear edge of each frame which co-operate with said first fixing means to secure together the front and rear edges of adjoining frames;
  and third fixing means for connecting the wedge shaped side pieces of each frame to the wedge shaped side pieces of adjoining frames.

\* \* \* \* \*